(12) United States Patent
Andrieux et al.

(10) Patent No.: US 6,217,740 B1
(45) Date of Patent: Apr. 17, 2001

(54) PROCESS FOR ELECTROCHEMICALLY PRODUCING A CARBONACEOUS MATERIAL WITH A SURFACE MODIFIED BY FUNCTIONALIZED GROUPS, NOVEL SURFACE-MODIFIED CARBONACEOUS MATERIAL AND APPLICATION OF THIS MATERIAL

(75) Inventors: Claude Andrieux, Paris (FR); Felipe Gonzalez, Edo de Mexico (MX); Jean Pinson, Fontenay sous Bois; Jean-Michel Saveant, Paris, both of (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 09/398,944

(22) Filed: Sep. 3, 1999

Related U.S. Application Data (63) Continuation of application No. PCT/FR98/00437, filed on Mar. 5, 1998.

(30) Foreign Application Priority Data

Mar. 7, 1997 (FR) .................................................. 97 02738

(51) Int. Cl.$^7$ .................................. C25B 3/00; C25B 3/10
(52) U.S. Cl. .......................... 205/413; 205/415; 205/416; 205/417
(58) Field of Search ...................................... 205/413, 415, 205/416, 417

(56) References Cited

U.S. PATENT DOCUMENTS

| | | | | |
|---|---|---|---|---|
| 4,097,344 | * | 6/1978 | Drury | 204/59 R |
| 4,844,781 | | 7/1989 | Sanchez et al. | 205/132 |

FOREIGN PATENT DOCUMENTS 0374680   6/1990  (EP) .

\* cited by examiner

*Primary Examiner*—Edna Wong
(74) *Attorney, Agent, or Firm*—Finnegan, Henderson, Farabow, Garrett & Dunner L.L.P.

(57) ABSTRACT

The invention concerns a process for electrochemically producing a carbonaceous material with its surface modified by organic groups, in particular functionalized organic groups. The process comprises providing a solution, in a protic or aprotic solvent, comprising a salt of a carboxylate of an organic residue capable of undergoing a Kolbe reaction. The solution is then put in contact with a carbonaceous material, wherein the carbonaceous material is positively polarized with respect to a cathode that is also in contact with the solution. The solution may optionally contain an electrolyte. The invention also concerns carbonaceous materials modified at the surface with arylmethyl groups and the use of these modified materials, for example, in the production of composite materials.

24 Claims, 4 Drawing Sheets

PROCESS FOR ELECTROCHEMICALLY PRODUCING A CARBONACEOUS MATERIAL WITH A SURFACE MODIFIED BY FUNCTIONALIZED GROUPS, NOVEL SURFACE-MODIFIED CARBONACEOUS MATERIAL AND APPLICATION OF THIS MATERIAL

This application is a continuation of International Application No. PCT/FR98/00437, filed Mar. 5, 1998, the content of which is incorporated herein by reference.

The present invention relates to a process for electrochemically producing a carbonaceous material with a surface modified by organic groups, in particular functionalized organic groups.

It also relates to a novel carbonaceous material with a surface modified by organic groups, in particular functionalized organic groups, and to various applications of this carbonaceous material.

The surface modification of carbon fibres constitutes a well known solution to improving the mechanical properties of composite materials. Some composite materials are formed of a matrix of organic resin reinforced by carbon fibres. It is known that the mechanical properties of these materials depend, at least partially, on the shear stress. The shear stress increases as the laminar cohesive strength increases, that is to say as the fibre/matrix adhesion increases. The surface modification of the carbon fibres makes it possible to create groups at the surface which improve the affinity (or the adhesion) of the fibres for the matrix.

In the majority of these processes, the fibre/matrix adhesion is improved by treating the surface of the carbon fibres chemically or electrochemically.

The usual methods for modifying the surface of carbonaceous materials involve powerful oxidation processes resulting in the formation of carboxyl, quinone, ketone or hydroxyl groups which can subsequently be coupled to substrates, in particular organic matrices.

Other processes via the electrochemical route make it possible to attach amino compounds to the fibre.

Document FR-A-2,477,593 discloses a process which consists in electrochemically treating the fibres in a solution of an ammonium sulphate or bisulphate, which results in the formation, on the surface of the fibres, of groups such as —$NH_2$ and =NH and in the improvement, for this reason, in the fibre/matrix adhesion.

Documents FR-A-2,564,489 and FR-A-2,607,528 disclose electrochemical processes in which nitrogenous groups are grafted to the carbon fibres, for example by oxidation of an aqueous solution of an amino compound.

Document JP-A-59 82467 discloses the electrochemical treatment of carbon fibres by cathodic reduction of amino compounds in aqueous medium.

The process disclosed in Patent EP-B-569,503 makes it possible to attach an aromatic group to the surface of a carbonaceous material by electrochemical reduction of a diazonium salt of formula $ArN_2X$ by bringing the carbonaceous material into contact with a solution of diazonium salt in an aprotic solvent and by negatively polarizing the carbonaceous material with respect to an anode also in contact with the solution of diazonium salt. This results in the attachment of the aromatic groups via a carbon (of the carbonaceous material)-aromatic carbon (of the Ar radical) bond.

In addition to the applications of these modified carbonaceous materials in the production of fibres/matrix composite materials, the said modified carbonaceous materials can be used to graft complexing compounds, biological molecules or other organic groups.

It is nevertheless desirable to provide other processes for the surface treatment of carbonaceous materials which will allow access to novel modified carbonaceous materials, the properties of which may vary or even be improved with respect to the properties of the already existing materials, with a greater diversity of grafted molecules.

The object of the present invention is to provide a solution to these problems.

The invention firstly relates to a process for electrochemically producing a carbonaceous material with a surface modified by groups, in particular functionalized groups, characterized in that it comprises bringing the said carbonaceous material into contact with a solution in a protic or aprotic solvent, optionally comprising an electrolyte, of a salt of a carboxylate of an organic residue, in particular a functionalized residue, (R) capable of undergoing the Kolbe reaction, in that the carbonaceous material is positively polarized with respect to a cathode also in contact with the solution of the said salt, and in that the modified carbonaceous material is recovered.

This is because it has been found that the anodic oxidation of carboxylates, of formula $RCO_2^-$, on carbonaceous electrodes results in an attachment of the R residue to the carbonaceous surface. The attachment of organic groups takes place covalently.

By convention, R will be known as "residue" when it is attached to the carboxylate and "group" when it is attached to the carbonaceous material. The term "group" being broader due to the optional subsequent conversions.

The electrochemical oxidation of carboxylates, also known as the Kolbe reaction, is one of the oldest electroorganic reactions. This reaction involves the oxidation of a carboxylate and causes the transfer of an electron to the positive electrode, which results in the formation of a molecule of carbon dioxide and of an R.radical. The Kolbe reaction is generally used to produce the R—R dimer.

The Applicant Company has unexpectedly shown that the R.radical or the carbocation which results therefrom by transfer of a second electron can be attached to a carbon atom of the surface of the carbonaceous material. The carbonaceous material-organic group bond is generally a carbon-carbon bond between a carbon of the carbonaceous material and the carbon of the methyl of the arylmethyl group, in particular functionalized arylmethyl group, which is fundamentally different from the bond obtained by the process according to Patent EP-569,503.

The invention relates in particular to a process, characterized in that the salt of a carboxylate of an organic residue, in particular a functionalized organic residue, (R) capable of undergoing the Kolbe reaction corresponds to the formula (I):

$$R_1R_2R_3CCO_2^-M^+ \qquad (I)$$

in which:

$R_1$, $R_2$ and $R_3$, which are identical or different, are chosen from
- a hydrogen atom,
- linear or branched aliphatic hydrocarbon-comprising radicals optionally comprising one or more double bond(s), one or more triple bond(s), one or more heteroatom(s) or one or more optionally functionalized aromatic radical(s),
- optionally functionalized aromatic or heteroaromatic radicals,
- at least one of the $R_1$, $R_2$ and $R_3$ radicals being an optionally functionalized aromatic or heteroaromatic radical, $M^+$ is a cation, in particular of the quaternary ammonium type.

The type of cation depends in particular on the solvent used; in the case of water or of a protic solvent, for example, the cation can be an alkaline cation.

The salt of formula I preferably comprises at least one functionalized aromatic or heteroaromatic radical.

$R_1$ and $R_2$ preferably correspond to a hydrogen atom.

The term "functionalized" means that the aromatic or heteroaromatic or optionally aliphatic radicals comprise one or more substituent(s) capable of reacting with a substrate or one or more substituent(s) which can be converted into substituents capable of reacting with a substrate.

These substituents can therefore be highly varied, according to the applications for which the carbonaceous materials are intended. Mention may be made, among the substituents capable of reacting directly with a resin, in particular an organic resin, of, by way of example, the —NH$_2$, —CH=CH$_2$ or —CF=CF$_2$ groups.

Mention may be made, among the precursor substituents which, after conversion, are capable of reacting with a resin, in particular an organic resin, of, by way of example, the NO$_2$, COHal, COOH or CN groups, Hal representing a halogen atom.

Mention may be made, among the substituents capable of reacting directly with a biological molecule, of, by way of example, the COOH or NH$_2$ groups.

Mention may be made, among the precursor substituents which, after conversion, are capable of reacting with a biological molecule, of, by way of example, the NO$_2$, COHal, CONH$_2$, COOH, COOCH$_3$, CN, CHO or CH$_2$OH groups, Hal representing a halogen atom.

Mention may be made, among substituents capable of reacting directly with functional organic molecules, of the NO$_2$, COHal, CONH$_2$, COOH, COOCH$_3$, CN, CHO or CH$_2$OH groups, Hal representing a halogen atom.

Mention may be made, among the precursor substituents which, after conversion, are capable of reacting with functional organic molecules, of the NO$_2$, COHal, CONH$_2$, COOH, COOCH$_3$, CN, CHO or CH$_2$OH groups, Hal representing a halogen atom.

In addition to the functional substituents, the aromatic or heteroaromatic radicals can comprise one or more unreactive substituents, such as alkyl radicals comprising 1 to 20 carbon atoms.

The term "aliphatic radicals" is understood to mean in particular linear or branched radicals comprising 1 to 20 carbon atoms optionally comprising one or more heteroatom(s) and optionally one or more double or triple bond(s). These aliphatic radicals can also comprise one or more halogen atom(s). By extension, the aliphatic radicals also comprise the cycloaliphatic radicals.

The halogen atoms can be chosen, for example, from chlorine, bromine, fluorine or iodine.

The term "aromatic radicals" is understood to mean all the well known radicals comprising one or more fused or independent benzene nuclei. Mention is made, without implying limitation, of the phenyl or naphthyl nuclei, triple-fused nuclei or biphenyl nuclei.

Mention is made, among the heteroaromatic radicals, of all the aromatic heterocycles comprising one or more heteroatoms, such as N, O, S or P.

In fact, it is understood that the invention is not limited to specific compounds, provided that they meet the condition of not being incompatible with the Kolbe reaction. Another necessary condition for ensuring the satisfactory progress of the reaction is that the steric hindrance of the R residue is not such that it renders difficult, indeed even impossible, the attachment of the R residue to the carbon atom of the carbonaceous material. For this reason, it is preferable for the carbon alpha to the aromatic or heteroaromatic radical to be relatively unrestricted. In other words, it is preferable for the carbon alpha to the aromatic or heteroaromatic radical to be secondary or primary and very advantageously primary, that is to say for $R_1$ and $R_2$ to correspond to a hydrogen atom.

Mention may be made, by way of example, of the following residues: benzyl (compound 1), 4-methylbenzyl (compound 2), 4-methoxybenzyl (compound 3), N,N'-dimethyl-4-aminobenzyl (compound 4), 3,4,5-trimethoxybenzyl (compound 5), 4-nitrobenzyl (compound 6), naphthylmethyl (compound 7), (9-methylanthryl)methyl (compound 8), diphenylmethyl (compound 9), triphenylmethyl (compound 10) or 4-(bromomethyl)benzyl (compound 11), the formulae of which are shown below:

1

2

3

-continued

4

5

6

7

8

9

10

11

The positive electrode composed of the carbonaceous material must be at an anodic potential value such that it can pull off an electron from the carboxylate.

This value can be measured with respect to a reference electrode and it is therefore understood that this potential difference value will vary according to the carboxylates.

The oxidation potential values with respect to the saturated calomel reference electrode (SCE) are given below for the abovementioned compounds:

1 $0.98_6$ V/SCE
2 $0.93_5$ V/SCE
3 $0.82_5$ V/SCE
4 $0.30_8$ V/SCE
5 $0.78_0$ V/SCE
6 $1.16_3$ V/SCE
7 $0.88_5$ V/SCE
8 $0.41_0$ V/SCE
9 $0.91_8$ V/SCE
10 $0.73_0$ V/SCE
11 1.32 V/SCE

In practice, according to an advantageous process, the anodic oxidation of the carboxylate ions is ensured by repetitive cyclic voltammetry in a potential region in which they are oxidized or by controlled-potential electrolysis (at the potential at which they are oxidized) or by controlled-current electrolysis with a current chosen according to conventional techniques of a person skilled in the art.

Mention may be made, among the polar aprotic solvents, by way of example, of acetonitrile, benzonitrile, butyronitrile, dichloromethane, 1,2-dichloroethane, dimethylformamide, dimethyl sulphoxide, dimethylacetamide, propylene carbonate, sulpholane or their mixtures.

Mention may be made, among the protic solvents, by way of example, of water, methanol, ethanol or their mixtures.

According to a preferred embodiment, the solution also comprises an electrolyte, such as quaternary ammonium salts or alkali metal salts.

Mention is made, among these, of alkali metal or quaternary ammonium tetrafluoroborates, perchlorates and hexafluorophosphates, in particular lithium tetrafluoroborate, a tetraalkylammonium tetrafluoroborate, such as tetrabutylammonium tetrafluoroborate, or tetrabutylammonium hexafluorophosphate.

The concentrations of carboxylate and of electrolyte are generally between $10^{-3}$ and $10^{-1}$ mol/l for the carboxylate and of $10^{-2}$ and 1 mol/l for the electrolyte.

If a very compact film is desired, an advantageous alternative form consists in carrying out the process in two stages.

The first stage consists in oxidizing the carboxylate at its oxidation potential. However, after this oxidation has resulted in the passivation of the carbonaceous electrode, which shows that the attachment of the R residue is complete, the existence was recorded, in a carboxylate solution, of an oxidation potential lying between the oxidation potential of the starting carboxylate and the oxidation potential of the R residue which is observed when the modified carbonaceous electrode is transferred into a solution of pure electrolyte.

The anodic oxidation of the carboxylate ions in a solution of electrolytes and of the carboxylate ions in contact with this modified electrode at this new oxidation potential results in the attachment of additional R residues to the carbonaceous electrode.

For this reason, according to this preferred alternative form, the modified carbonaceous electrode according to the first stage is again subjected to an anodic polarization at the appropriate oxidation potential, which results in a further passivation of the carbonaceous electrode by attachment of additional R residues. This makes it possible to obtain a much denser surface film of R residues.

This second oxidation is also carried out, preferably by repetitive cyclic voltammetry, in the potential region required or by controlled-potential electrolysis (at the potential at which they are oxidized) or by controlled-current electrolysis with a current chosen according to the conventional techniques of a person skilled in the art.

Without the invention being in any way linked to a scientific explanation, the inventors believe that, after the first stage, the surface of the carbonaceous material still comprises certain sites where electron transfer can still take place. These sites are blocked by carboxylate ions. The R residues already attached could bring about a significant decrease in the local dielectric constant, thus causing a strong electrostatic attraction between the carboxylate ions and the charged surface of the electrode.

This would be the reason why a second, more positive, potential results in an additional attachment of R residues.

The modified carbonaceous materials are recovered and they can be characterized in several ways.

Mention is made of cyclic voltammetry, X-ray photoelectron spectroscopy and tunnelling microscopy.

The measurements carried out confirm the attachment of the R residues to the carbonaceous surface. The surface density of the R residues depends on the steric hindrance of the latter and will therefore vary according to the R residues under consideration. The surface densities of the R residues for the carbonaceous materials modified by employing the process according to the invention with the carboxylates Nos. 6, 7 and 8 are given in the examples.

According to another alternative form, the carbonaceous conducting materials, the surface of which has been modified by the process according to the invention, are subjected to a subsequent conversion of the functional substituents. For example, the substituents may be converted in order to react with a resin, a biological molecule or a functional organic molecule.

The invention thus applies to the carbonaceous materials converted following the process according to the invention.

The invention also relates to the carbonaceous materials capable of being obtained by the process according to the invention.

The modified carbonaceous materials, in particular comprising carbon black, comprising highly oriented pyrolytic graphite (HOPG) or comprising glassy carbon, are provided, according to an alternative form, in the form of fibres, powders, felt, fabric, beads or carbon-carbon composites.

Figure 1:
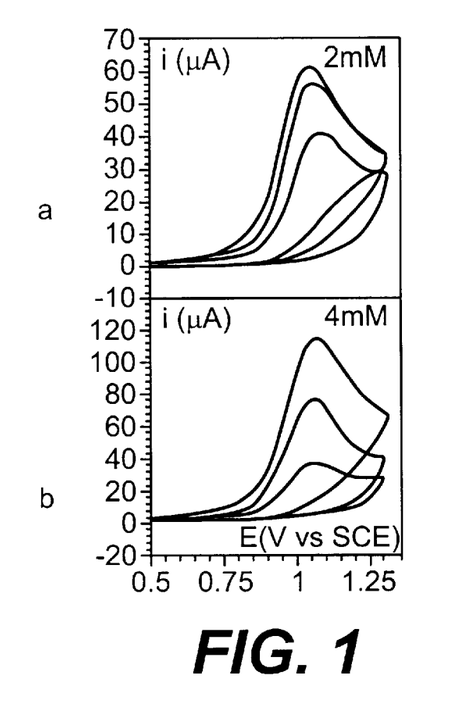
FIG 1: Cyclic voltammograms of a solution of carboxylate 1 at a sweep rate of 0.2 V/s. The initial concentration of carboxylate 1 was 2 mM (a) and 4 mM (b).

The process according to the invention can be employed using a known electrolysis cell, such as that which is disclosed in Patent EP-B-569,503, FIG. 1, and description, page 8, lines 12 to 25, the contents of which are incorporated by reference.

The invention also relates to the carbonaceous materials with a surface modified by R groups of formula (II):

$$R_1R_2R_3C \quad \quad (II)$$

in which:

$R_1$, $R_2$ and $R_3$, which are identical or different, are chosen from:

a hydrogen atom, linear or branched aliphatic hydrocarbon-comprising radicals optionally comprising one or more double bond(s), one or more triple bond(s), one or more heteroatom(s), one or more optionally functionalized aromatic radicals or optionally functionalized aromatic or heteroaromatic radicals, at least one of the $R_1$, $R_2$ and $R_3$ radicals being an optionally functionalized aromatic or heteroaromatic radical.

The description of the R residues indicated in the description of the process applies to the description of the R groups attached to the carbonaceous material.

It is preferable for the carbon alpha to the aromatic or heteroaromatic radical to be secondary or primary and very advantageously primary, that is to say for $R_1$ and $R_2$ to correspond to a hydrogen atom.

Mention is made, by way of example, of the following groups: benzyl, 4-methylbenzyl, 4-methoxybenzyl, N,N'-dimethyl-4-aminobenzyl, 3,4,5-trimethoxybenzyl, 4-nitrobenzyl, naphthylmethyl, (9-methylanthracyl)methyl, diphenylmethyl, triphenylmethyl or 4-(bromomethyl)benzyl.

The invention also relates to the modified carbon fibres and the modified carbon powders based on the carbonaceous material according to the invention.

These modified fibres preferably comprise substituents capable of reacting covalently with radicals present on an organic resin intended to be used in combination with the said fibres in the form of composite materials. Mention is made, among the substituents capable of reacting directly with a resin, in particular an organic resin, of, by way of example, the $NH_2$, $-CH=CH_2$ or $-CF=CF_2$ groups.

Mention is made, among the precursor substituents which, after conversion, are capable of reacting with a resin, in particular an organic resin, of, by way of example, the $NO_2$, COHal, COOH or CN groups, with Hal representing a halogen atom.

Of course, the nature of these substituents is generally highly varied and depends on the organic resin under consideration. The listing indicated above is therefore in no way limiting.

The invention also relates to the composite materials comprising an organic resin matrix reinforced with modified carbon fibres according to the invention.

The matrix of a composite material can be a thermosetting polymer, such as an epoxy resin, or a thermoplastic resin, for example a polyamide, polyethylene or polytetrafluoroethylene resin.

The invention also relates to carbonaceous materials modified by R groups, the substituents of which are capable of covalently attaching chemical compounds, such as complexing agents, or biological molecules, such as proteins and in particular enzymes.

Mention may be made, among the substituents capable of reacting directly with a biological molecule, of, by way of example, the COOH or $NH_2$ groups.

Mention may be made, among the precursor substituents which, after conversion, are capable of reacting with a biological molecule, of, by way of example, the $NO_2$, COHal, $CONH_2$, COOH, $COOCH_3$, CN, CHO or $CH_2OH$ groups, with Hal representing a halogen atom.

The examples below illustrate the invention.

All the examples are carried out in an electrolysis cell, into which is introduced a solution of electrolyte and of a carboxylate, the said solution exhibiting the following characteristics:

Solvent: acetonitrile,

Carboxylates: benzyl (compound 1), 4-methylbenzyl (compound 2), 4-methoxybenzyl (compound 3), N,N'-dimethyl-4-aminobenzyl (compound 4), 3,4,5-trimethoxybenzyl (compound 5), 4-nitrobenzyl (compound 6), naphthylmethyl (compound 7), (9-methylanthryl)methyl (compound 8) or 4-(bromomethyl)benzyl (compound 11).

The carboxylates were prepared by addition of a stoichiometric amount of n-Bu$_4$NOH.

Electrolyte: 0.1M n-Bu$_4$NPF$_6$.

The experiments are carried out on glassy carbon (GC) electrodes, except for the characterization by tunnelling electron microscopy (TEM), where a highly oriented graphite (HOPG) electrode was used.

EXAMPLES

Example 1

A solution of the carboxylate 1 at a concentration of 2 mM or 4 mM is subjected to repeated cyclic voltammetry in the potential region in which the carboxylate ions are oxidized.

The solution is stirred by bubbling argon between each cycle.

FIG. 1 illustrates the voltammogram of this carboxylate 1 for repeated cycles at a sweep rate of 0.2 V/s.

These characteristics are collated in the table below.

The surface density can be estimated approximately at $2.5 \times 10^{10}$ mol/cm$^2$.

| Electrode | Total C % 285–289 eV | Total O % 533 eV | Total NO$_2$ % 406 eV | Reduced N % 400 eV | CO$_2$H % 289 eV |
|---|---|---|---|---|---|
| GC | 75.1 | 21.1 | 2.2 | 1.6 | 0.0 |
|  | (90.0) | (9.5) | (0.0) | (0.4) | (0.0) |
| Carbon fibre | 70.8 | 27.7 | 2.3 | 0.0 | 0.0 |
|  | (90.8) | (8.6) | (0.0) | (0.0) | (0.0) |
| HOPG | 89.3 | 7.8 | 1.5 | 1.4 | 0.0 |
|  | (99.7) | (0.3) | (0.0) | (0.0) | (0.0) |

The passivation observed becomes faster as the initial concentration of the carboxylate increases (FIG. 1a, 2 mM; FIG. 1b, 4 mM).

At a concentration of 2 mM, the anodic peak disappears after 13 cycles.

At a concentration of 4 mM, the anodic peak disappears after 9 cycles.

The phenomenon of inhibition is shown by the disappearance of the anodic peak, which indicates that the benzyl groups are attached to the carbonaceous material, bringing about the passivation of the latter.

Example 2

The compounds 2, 3, 4, 5, 6, 7 and 8, tested under the same conditions, the formula of which was shown in the description, result in a phenomenon of inhibition, although the number of cycles required varies according to the case.

For the compounds 2, 3, 4, 5, 6 and 7, the number of cycles is of the same order as for the compound 1 for similar concentrations.

For the compounds 4 and 8, the phenomenon is slower (approximately 50 cycles are needed).

The potential peaks observed with the various carboxylates are as follows, at 0.1 V/s:

| 1 | 2 | 3 | 4 | 5 | 6 | 7 | 8 | 9 | 10 |
|---|---|---|---|---|---|---|---|---|---|
| 0.98$_6$ | 0.93$_5$ | 0.82$_5$ | 0.30$_8$ | 0.78$_0$ | 1.16$_3$ | 0.88$_5$ | 0.41$_0$ | 0.91$_8$ | 0.73$_0$ |

Characterization of the Material Obtained for the Carboxylate 6

1) by Cyclic Voltammetry

Figure 2:
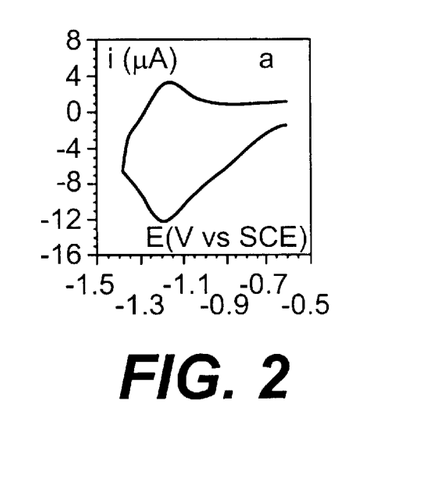
FIG 2: A Cyclic voltammograms of an electrode passivated by oxidation of carboxylate 6 and transferred into a pure electrolye solution (acetonitrile+0.1 M of n-$Bu_4NPF_6$). The sweep rate was 0.2 V/s.

FIG. 2 shows the response under cyclic voltammetry of an electrode passivated by oxidation of 6 and transferred into a pure electrolytic solution (acetonitrile+0.1M of n-Bu$_4$NPF$_6$), for a sweep rate of 0.2 V/s.

A surface wave is observed in the same potential region as a nitrobenzene solution.

2) by X-ray Photoelectron Spectroscopy

Figure 3:
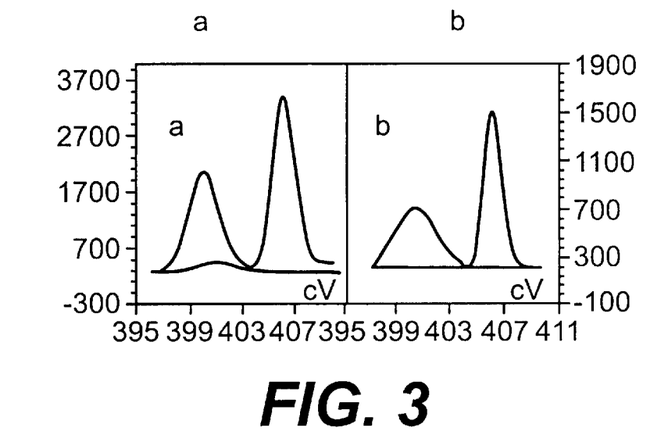
FIG. 3: The X-Ray photoelectron spectrum of a glassy carbon electrode (a) and a highly oriented graphite electrode (b).

The presence of nitro groups is also revealed on electrodes, either of glassy carbon (FIG. 3a) or of highly oriented graphite (FIG. 3b), by the signal of the nitrogen of the nitro group at 406 eV.

The characteristics of the full spectrum of the glassy carbon (GC), highly oriented graphite (HOPG) or carbon fibre electrodes were also determined by X-ray photoelectron spectroscopy.

The figures between brackets correspond to the bare surface.

Characterization of the Material Obtained for the Carboxylate 8

The electrodes passivated by the carboxylate 8 display the same behaviour under reductive cyclic voltammetry. That is to say, that the presence of the 9-methylanthryl group is attested by the presence of a signal for reversible reduction of the 9-methylanthracene, as well as by a signal for slightly reversible oxidation lying in the same potential area as the signal for oxidation of the 9-methylanthracene.

A slight reversibility of the voltammogram is observed during the cycling of a passivated electrode transferred into a pure electrolytic solution. This wave is located in the same potential region as the wave for oxidation of the 9-methylanthracene solution.

The following distribution of the (9-methylanthryl)methyl residues over the carbonaceous surface is obtained by tunnelling electron microscopy, to be compared with the Dreiding model, the calculation of which is based on the radius of rotation of the R residue:

| Distances (A) | TEM | Model |
|---|---|---|
| the shortest | 15.1 | 14.9 |
| the longest | 22.3 | 21.2 |
| the shortest diagonal | 24.3 | 23.7 |

The surface density can be estimated approximately at $1.4 \times 10^{10}$ mol/cm2.

Characterization of the Material Obtained for the Carboxylate 7

The electrodes passivated by the carboxylate 7 display the same behaviour under reductive cyclic voltammetry as the electrodes exemplified previously. However, the voltammogram for oxidative cycling does not display reversibility.

The cyclic voltammogram under reduction is less reversible than in the case of 8 at 0.2 V/s but the reversibility can be restored by increasing the sweep rate to 20 V/s.

The following distribution of the naphthylmethyl residues over the carbonaceous surface is obtained by tunnelling microscopy, to be compared with the Dreiding model, the calculation of which is based on the radius of rotation of the residue:

| Distances (A) | TEM | Model |
| --- | --- | --- |
| the shortest | 14.5 | 14.6 |
| the longest | 19.5 | 18.6 |
| the shortest diagonal | 25.2 | 23.0 |

The surface density can be estimated approximately at 1.5 $10^{-10}$ mol/cm$^2$.

Characterization of the Materials Obtained for the Carboxylates 1, 2, 3 and 5

The presence of the corresponding groups at the surface of materials is attested under cyclic voltammetry by irreversible waves for oxidation located in the same potential region as the solution of the corresponding hydrocarbons.

Characterization of the Material Obtained for the Carboxylate 4

Cyclic voltammetry of the electrode passivated by the carboxylate 4 in a pure electrolytic solution displays an oxidation wave in the same potential region as the wave for oxidation of the N,N'-dimethylaniline solution. At a low sweep rate (0.2 V/s), the wave is irreversible, at a higher sweep rate (20 V/s), the wave becomes reversible.

Example 3
Additional Oxidation Process

Figure 4:
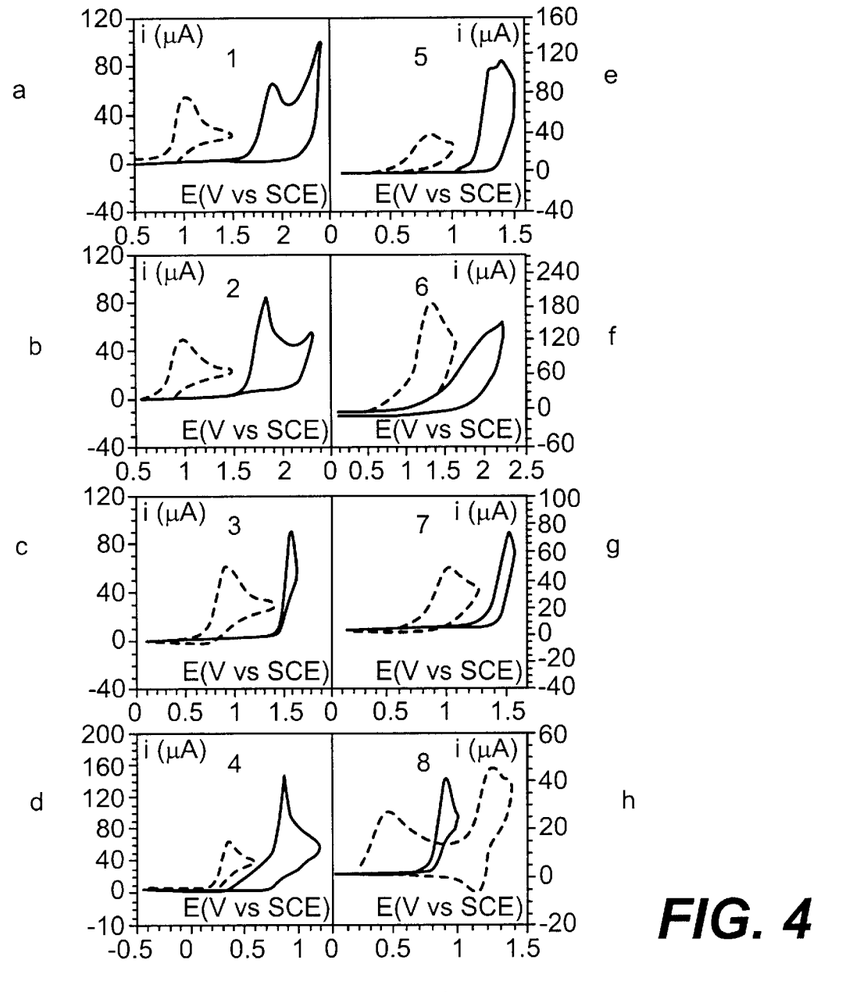
FIG. 4: Cyclic voltammograms of glassy carbon electrodes passivated with carboxylates 1 through 8 (solid line) at a sweep rate of 0.2 V/s. The dotted lines represent the initial oxidation of the carboxylate.

The glassy carbon electrode obtained with the carboxylate 1 according to Example 1 is subjected to cyclic voltammetry at 0.2 V/s in a 2 mM solution of carboxylate 1 in acetonitrile+0.11M n-Bu$_4$NPF$_6$ and exhibits a more positive oxidation wave than the wave for oxidation of the carboxylate (as shown in FIG. 4a, the dotted lines representing the initial oxidation of the carboxylate) According to this experiment, the number of benzyl residues attached to the carbonaceous electrode is increased.

Example 4
Additional Oxidation Process

The glassy carbon electrode obtained with the carboxylate 2 is subjected to cyclic voltammetry at 0.2 V/s in a 2 mM solution of carboxylate 2 and exhibits a more positive oxidation wave than the wave for oxidation of the carboxylate (as shown in FIG. 4b, the dotted lines representing the initial oxidation of the carboxylate). According to this experiment, the number of 4-methylbenzyl residues attached to the carbonaceous electrode is increased.

Example 5
Additional Oxidation Process

The glassy carbon electrode obtained with the carboxylate 3 is subjected to cyclic voltammetry at 0.2 V/s in a 2 mM solution of carboxylate 3 and exhibits a more positive oxidation wave than the wave for oxidation of the carboxylate (as shown in FIG. 4c, the dotted lines representing the initial oxidation of the carboxylate). According to this experiment, the number of 4-methoxybenzyl residues attached to the carbonaceous electrode is increased.

Example 6
Additional Oxidation Process

The glassy carbon electrode obtained with the carboxylate 4 is subjected to cyclic voltammetry at 0.2 V/s in a 2 mM solution of carboxylate 4 and exhibits a more positive oxidation wave than the wave for oxidation of the carboxylate (as shown in FIG. 4d, the dotted lines representing the initial oxidation of the carboxylate). According to this experiment, the number of N,N'-dimethylaminobenzyl residues attached to the carbonaceous electrode is increased.

Example 7
Additional Oxidation Process

The glassy carbon electrode obtained with the carboxylate 5 is subjected to cyclic voltammetry at 0.2 V/s in a 2 mM solution of carboxylate 5 and exhibits a more positive oxidation wave than the wave for oxidation of the carboxylate (as shown in FIG. 4e, the dotted lines representing the initial oxidation of the carboxylate). According to this experiment, the number of 3,4,5-trimethoxybenzyl residues attached to the carbonaceous electrode is increased.

Example 8
Additional Oxidation Process

The glassy carbon electrode obtained with the carboxylate 6 is subjected to cyclic voltammetry at 0.2 V/s in a 5 mM solution of carboxylate 6 and exhibits a more positive oxidation wave than the wave for oxidation of the carboxylate (as shown in FIG. 4f, the dotted lines representing the initial oxidation of the carboxylate). According to this experiment, the number of 4-nitrobenzyl residues attached to the carbonaceous electrode is increased.

Example 9
Additional Oxidation Process

The glassy carbon electrode obtained with the carboxylate 7 is subjected to cyclic voltammetry at 0.2 V/s in a 2 mM solution of carboxylate 7 and exhibits a more positive oxidation wave than the wave for oxidation of the carboxylate (as shown in FIG. 4g, the dotted lines representing the initial oxidation of the carboxylate). According to this experiment, the number of naphthylmethyl residues attached to the carbonaceous electrode is increased.

Example 10
Additional Oxidation Process

The glassy carbon electrode obtained with the carboxylate 8 is subjected to cyclic voltammetry at 0.2 V/s in a 1 mM solution of carboxylate 8 and exhibits a more positive oxidation wave than the wave for oxidation of the carboxylate (as shown in FIG. 4h, the dotted lines representing the initial oxidation of the carboxylate). According to this experiment, the number of (9-methylanthryl)methyl residues attached to the carbonaceous electrode is increased.

Characterization of the Materials Obtained for the Carboxylates 7 and 8 According to Examples 9 and 10

Figure 5:
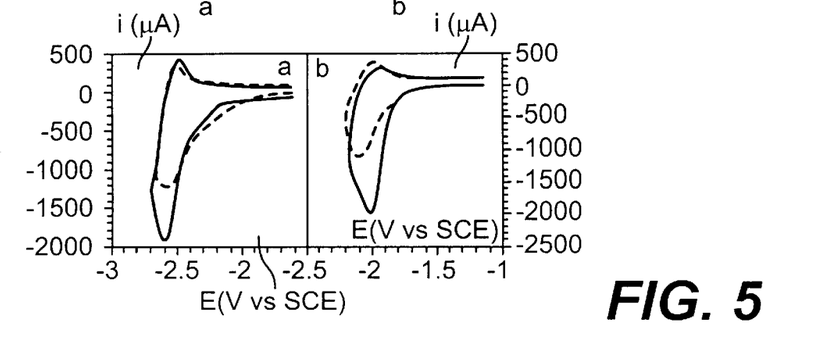
FIG. 5: Cyclic voltammograms of glassy carbon electrodes passivated by carboxylates 7 (a) through 8 (b) at a sweep rate of 0.2 V/s. The dotted lines represent the initial oxidation of the carboxylate.

Cyclic voltammetry at a sweep rate of 20 V/s of the electrodes passivated by the carboxylates 7 and 8 in a pure electrolytic solution displays reversible curves located in the same potential region as the solutions of the corresponding hydrocarbons (dotted lines of FIGS. 5a and 5b).

Characterization of the Carbonaceous Materials Modified According to Examples 9 and 10 By Tunnelling Microscopy The measurements are shown in the table below:

For the carbonaceous material with residue 7:

| Distances (A) | TEM | Model |
| --- | --- | --- |
| the shortest | 8.2 | 8.4 |
| the longest | 11.0 | 11.1 |
| the shortest diagonal | 12.2 | 12.6 |

For the carbonaceous material with residue 8:

| Distances (Å) | TEM | Model |
| --- | --- | --- |
| the shortest | 8.0 | 8.4 |
| the longest | 11.1 | 10.5 |
| the shortest diagonal | 11.2 | 10.4 |

It is found that the surface density is at least 5 times that obtained with the first oxidation.

It is therefore found that highly varied modified carbonaceous materials can be obtained by the process according to the invention and that these materials can give rise to numerous applications, due to the diversity of the grafted groups and to the conducting nature of the carbonaceous supports.

Example 11

Figure 6:
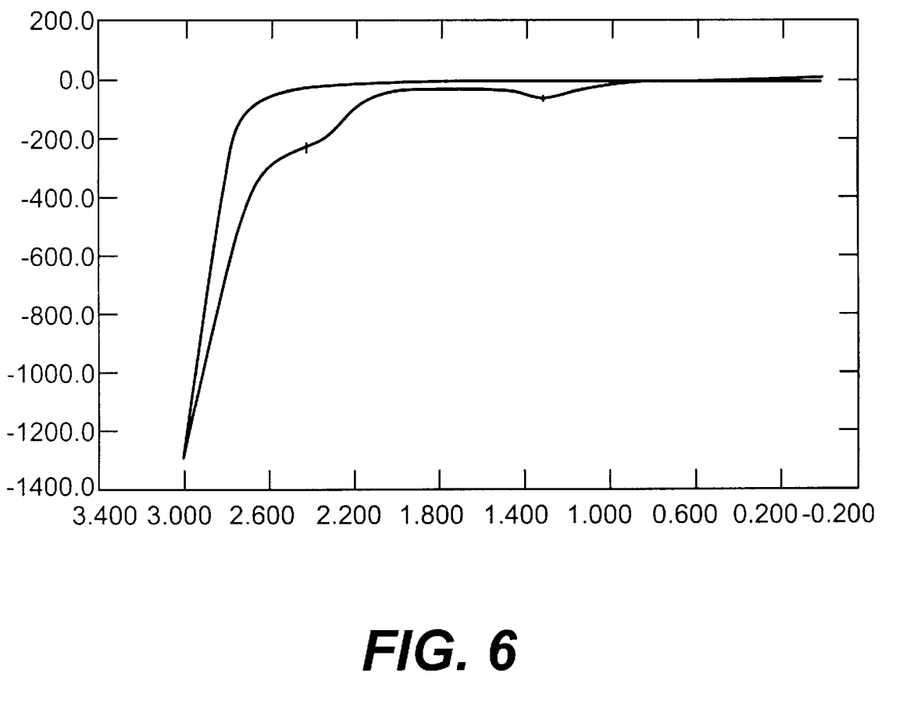
FIG. 6: The voltammogram at a sweep rate of 0.2 V/s of carboxylate 11 at a concentration of 2.29 mM in a solution of acetonitrile+0.1 M of n-$BU_4NPF_6$. A glassy carbon electrode was used.

FIG. 6 represents the voltammogram of the carboxylate 11 at 2.29 mM in a solution of acetonitrile and of 0.1M of $NBu_4PF_6$, the electrode being glassy carbon, for a sweep rate of 0.2 V/s. The carboxylate 11 exhibits two irreversible waves at approximately 1.1–1.3 V/SCE and 2.4 V/SCE.

Figure 7:
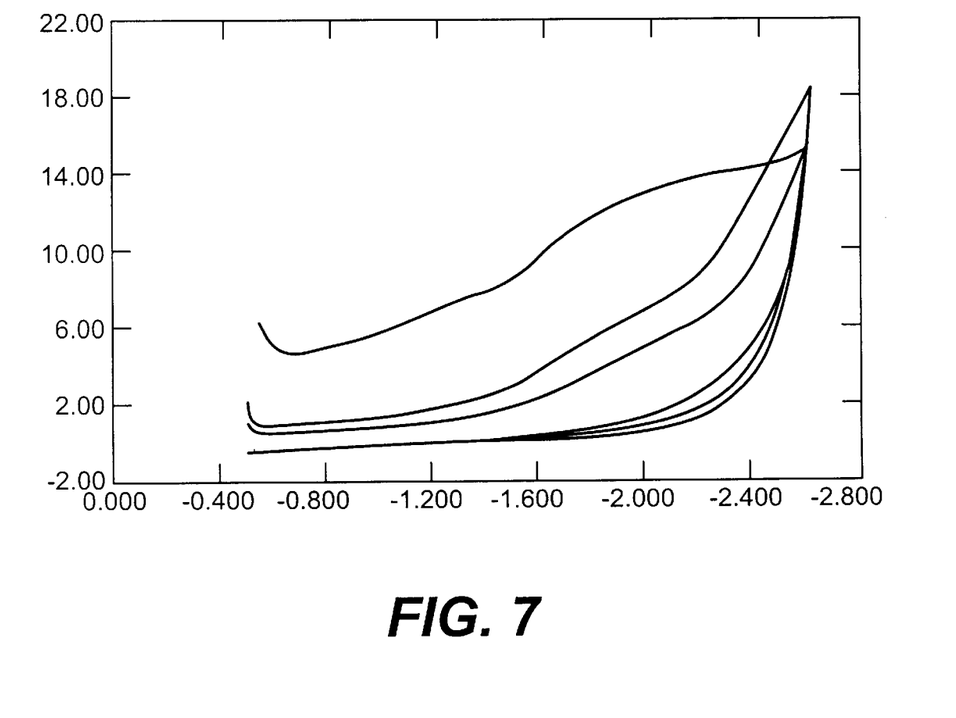
FIG. 7: The voltammogram at a sweep rate of 0.2 V/s of a glassy carbon electrode grafted with groups of carboxylate 11 in acetonitrile and 0.1 M of n-$BU_4NPF_6$.

During successive sweeps over the first wave, a shift of the anodic peak towards positive potentials is observed. For example, the peak is moved by 120 mV in eight sweeps. Electrolysis of the carboxylate 11 is carried out at 1.2 V/SCE for 15 minutes on the glassy carbon electrode. At the end of this electrolysis, the electrode is carefully rinsed in an ultrasound vessel in acetone and then alcohol for 5 minutes (in each solvent) and finally transferred into a solution comprising only the solvent and the support electrolyte. In FIG. 7 (representing the voltammogram of an electrode made of glassy carbon grafted with groups of carboxylate 11 in acetonitrile and 0.1M of $NBu_4BF_4$, for a rate of progression of 0.2 V/s), a very broad irreversible cathodic wave is observed situated at approximately −2.0 V/SCE. The potential of this wave is similar to that of benzyl bromide under the same conditions (−1.94 V/SCE). During a second sweep, this wave disappears.

In conclusion, grafting of the carboxylate 11 to the glassy carbon is clearly observed. The degree of grafting to glassy carbon was measured from the area of the wave for bielectronic reduction corresponding to the cleavage of the C—Br bond of the grafted surface. The value found is approximately $6 \times 10^{-1}$ mol/cm$^2$.

What is claimed is:

1. A process for electrochemically preparing a surface modified carbonaceous material, said process comprising:
   providing a solution comprising (R), wherein (R) is a salt of a carboxylate of an organic residue capable of undergoing a Kolbe reaction and wherein said solution is in a protic or aprotic solvent; and
   contacting said solution with a carbonaceous material, wherein said carbonaceous material is positively polarized with respect to a cathode that is also in contact with said solution, to obtain said surface modified carbonaceous material.

2. The process of claim 1, wherein said organic residue is a functionalized organic residue.

3. The process of claim 1, wherein said surface modified carbonaceous material is modified by functionalized groups.

4. The process of claim 1, further comprising the step of recovering said surface modified carbonaceous material.

5. The process of claim 1, wherein said protic or aprotic solvent comprises an electrolyte.

6. The process of claim 5, wherein said electrolyte is present in a concentration ranging from $10^{-2}$ mol/l to 1 mol/l.

7. The process of claim 1, wherein said salt of a carboxylate of an organic residue is a compound of formula (I):

$$(R_1)(R_2)(R_3)C\text{—}CO_2^-M^+ \qquad (I)$$

wherein:
$R_1$, $R_2$ and $R_3$, which may be identical or different, are chosen from
   a hydrogen atom,
   linear or branched aliphatic hydrocarbon-comprising radicals, or
   aromatic or heteroaromatic radicals,
   wherein at least one of $R_1$, $R_2$ and $R_3$ is an aromatic or heteroaromatic radical, and $M^+$ is a cation.

8. The process of claim 7, wherein said linear or branched aliphatic hydrocarbon-comprising radicals contain at least one double bond, at least one triple bond, at least one heteroatom, or at least one aromatic radical.

9. The process of claim 8, wherein said at least one aromatic radical is a functionalized aromatic radical.

10. The process of claim 7, wherein said aromatic or heteroaromatic radicals are functionalized aromatic or functionalized heteroaromatic radicals.

11. The process of claim 7, wherein said compound of formula (I) comprises at least one functionalized aromatic or functionalized heteroaromatic radical.

12. The process of claim 11, wherein said functionalized aromatic or functionalized heteroaromatic radical is functionalized by at least one substituent capable of reacting directly with a substrate or by at least one precursor substituent capable, after conversion of reacting with said substrate.

13. The process of claim 12, wherein said substituent is capable of reacting directly with an organic resin and said substituent is chosen from —$NH_2$, —CH=$CH_2$ and —CF=$CF_2$.

14. The process of claim 12, wherein said precursor substituent is capable, after conversion, of reacting with an organic resin and said precursor substituent is chosen from $NO_2$, CO-Hal, COOH and CN,
   wherein Hal is a halogen atom.

15. The process of claim 12, wherein said substituent is capable of reacting directly with a biological molecule and said substituent is chosen from COOH and $NH_2$.

16. The process of claim 12, wherein said substituent is capable of reacting directly with a functional organic molecule and said substituent is chosen from $NO_2$, COHal, $CONH_2$, COOH, $COOCH_3$, CN, CHO and $CH_2OH$,
   wherein Hal is a halogen atom.

17. The process of claim 12, wherein said precursor substituent is capable, after conversion, of reacting with a biological molecule or a functional organic molecule and said precursor substituent is chosen from $NO_2$, COHal, $CONH_2$, COOH, $COOCH_3$, CN, CHO and $CH_2OH$,
   wherein Hal is a halogen atom.

18. The process of claim 12, wherein said surface modified carbonaceous material is subjected to subsequent conversion of at least one of said precursor substituents.

19. The process of claim 7, wherein $R_1$ and $R_2$ are each a hydrogen atom.

20. The process of claim 1, wherein said aprotic solvent is chosen from acetonitrile, benzonitrile, butyronitrile, dichloromethane, 1,2-dichloroethane, dimethylformamide, dimethyl sulphoxide, dimethylacetamide, propylene carbonate, sulpholane and mixtures thereof.

21. The process of claim 1, wherein said protic solvent is chosen from water, methanol, ethanol and mixtures thereof.

22. The process of claim 1, wherein anodic oxidizing of at least one carboxylate ion of said salt is provided by
   (a) repetitive cyclic voltammetry in a potential region in which said carboxylate ion is oxidized, or
   (b) electrolysis.

23. The process of claim 1, wherein said salt is present in a concentration of carboxylate ions ranging from $10^{-3}$ mol/l to $10^{-1}$ mol/l.

24. The process of claim 1, wherein said carbonaceous material, which is positively polarized with respect to a cathode that is also in contact with said solution, has an oxidation potential sufficient to pull off an electron from said carboxylate.

* * * * *